(12) United States Patent
Guest

(10) Patent No.: US 8,056,937 B2
(45) Date of Patent: Nov. 15, 2011

(54) TUBE COUPLINGS

(75) Inventor: Timothy Steven Guest, Bray (GB)

(73) Assignee: John Guest International Limited, West Drayton, Middlesex (GB)

( * ) Notice: Subject to any disclaimer, the term of this patent is extended or adjusted under 35 U.S.C. 154(b) by 432 days.

(21) Appl. No.: 11/952,680

(22) Filed: Dec. 7, 2007

(65) Prior Publication Data

US 2008/0136166 A1    Jun. 12, 2008

(30) Foreign Application Priority Data

Dec. 12, 2006  (GB) .................................. 0624784.5

(51) Int. Cl.
*F16L 39/00* (2006.01)

(52) U.S. Cl. ............................ 285/319; 285/81; 285/323

(58) Field of Classification Search .................. 285/319, 285/322, 323, 81, 179, 133.11
See application file for complete search history.

(56) References Cited

U.S. PATENT DOCUMENTS

| | | | | |
|---|---|---|---|---|
| 26,522 A | * | 12/1859 | Ransom | 285/179 |
| 102,443 A | * | 4/1870 | Smith | 285/133.11 |
| 109,695 A | * | 11/1870 | Westinghouse | 285/319 |
| 1,038,948 A | * | 9/1912 | Patrick | 285/322 |
| 3,454,290 A | * | 7/1969 | Tairraz | 285/323 |
| 3,653,689 A | * | 4/1972 | Sapy et al. | 285/323 |
| 3,750,248 A | * | 8/1973 | Morris | |
| 3,933,378 A | * | 1/1976 | Sandford et al. | 285/319 |
| 4,005,883 A | | 2/1977 | Guest | |
| 4,035,005 A | * | 7/1977 | DeVincent et al. | 285/319 |
| 4,573,716 A | | 3/1986 | Guest | |
| 4,606,783 A | | 8/1986 | Guest | |
| 4,637,636 A | | 1/1987 | Guest | |
| 4,645,246 A | | 2/1987 | Guest | |
| 4,650,529 A | | 3/1987 | Guest | |
| 4,657,286 A | | 4/1987 | Guest | |
| 4,705,304 A | * | 11/1987 | Matsuda et al. | 285/322 |
| 4,722,560 A | | 2/1988 | Guest | |
| 4,804,213 A | | 2/1989 | Guest | |
| 4,923,220 A | | 5/1990 | Guest | |
| 4,946,213 A | | 8/1990 | Guest | |
| 4,958,858 A | | 9/1990 | Guest | |
| 5,039,139 A | * | 8/1991 | McElroy et al. | 285/319 |
| 5,112,087 A | * | 5/1992 | Haruki | 285/322 |

(Continued)

FOREIGN PATENT DOCUMENTS

DE    101 14 326 A1    10/2002

(Continued)

*Primary Examiner* — Aaron Dunwoody
*Assistant Examiner* — Gwendolyn Driggers
(74) *Attorney, Agent, or Firm* — Workman Nydegger

(57) ABSTRACT

A tube coupling includes a coupling body having a stem with an end to engage in a tube and an encircling head spaced from said end. A cap is mounted on the head having an open end encircling the stem to receive a tube inserted into the cap over the stem, the cap having an internal tapered cam surface. A tube locking collet is located in the open end of the cap and includes an annular member having a plurality of resilient fingers which engage the tapered cam surface. The cap includes a sleeve having a cylindrical main portion which encircles and is mounted on the head of the coupling body. The main portion projects along the stem and a portion of reducing diameter which provides said internal tapered cam surface with which the collet engages and the cap has locking elements which engage the head of the coupling body.

8 Claims, 4 Drawing Sheets

U.S. PATENT DOCUMENTS

| | | | |
|---|---|---|---|
| 5,125,694 A * | 6/1992 | Gobbi | 285/322 |
| 5,370,423 A | 12/1994 | Guest | |
| 5,390,969 A | 2/1995 | Guest | |
| 5,401,064 A | 3/1995 | Guest | |
| 5,443,289 A | 8/1995 | Guest | |
| 5,468,027 A | 11/1995 | Guest | |
| 5,607,193 A | 3/1997 | Guest | |
| 5,683,121 A | 11/1997 | Guest | |
| 5,725,257 A * | 3/1998 | Sakane et al. | 285/81 |
| 5,735,555 A * | 4/1998 | Answine et al. | 285/319 |
| 5,738,387 A | 4/1998 | Guest | |
| 5,775,742 A | 7/1998 | Guest | |
| 5,779,284 A | 7/1998 | Guest | |
| 5,915,738 A | 6/1999 | Guest | |
| 6,056,326 A | 5/2000 | Guest | |
| 6,173,999 B1 | 1/2001 | Guest | |
| 6,224,117 B1 | 5/2001 | Olson et al. | |
| 6,349,978 B1 * | 2/2002 | McFarland et al. | 285/319 |
| 6,439,620 B1 | 8/2002 | Guest | |
| 6,749,233 B2 * | 6/2004 | Ohya | 285/322 |
| 6,863,314 B2 | 3/2005 | Guest | |
| 6,880,865 B2 | 4/2005 | Guest | |
| RE38,786 E | 8/2005 | Guest | |
| 6,929,289 B1 | 8/2005 | Guest | |
| 6,957,833 B2 | 10/2005 | Guest | |
| 7,032,932 B2 | 4/2006 | Guest | |
| 7,082,957 B2 | 8/2006 | Guest | |
| 7,100,948 B2 | 9/2006 | Guest | |
| 2005/0035597 A1 * | 2/2005 | Bamberger et al. | 285/340 |
| 2007/0001453 A1 * | 1/2007 | Miyajima et al. | 285/319 |

FOREIGN PATENT DOCUMENTS

| | | |
|---|---|---|
| EP | 0 247 214 A1 | 12/1987 |
| EP | 1 308 662 A3 | 5/2003 |
| GB | 2 051 280 A | 1/1981 |
| GB | 2 178 810 A | 2/1987 |
| WO | WO 2005/057066 A3 | 6/2005 |
| WO | WO 2006/041285 A3 | 4/2006 |

* cited by examiner

TUBE COUPLINGS

CROSS-REFERENCE TO RELATED APPLICATIONS

This application claims priority to United Kingdom Application No. 0624784.5, filed Dec. 12, 2006, the contents of which are incorporated herein by specific reference.

BACKGROUND OF THE INVENTION

1. The Field of the Invention

The invention relates to tube couplings for making a connection for fluid flow with a tube. The coupling may be single or multiple ended for coupling a tube to another component or components or may be part of a manifold or other form of tube connection.

2. The Relevant Technology

DE-A-10114326 discloses a connecting element for pipes with a base member which has a socket which can be inserted into the pipe, and with at least one sealing element which is arranged externally on the circumference of the socket. A sleeve is spaced radially from the socket to accommodate the pipe and has windows which enable the pipe disposed on the socket to be visually inspected. Retaining claws are formed where the wall is pressed out to form the windows to engage the pipe which extend into this free space. The claws enable the pipe to be pushed onto the socket but prevent withdrawal of the pipe from the socket.

SUMMARY OF THE INVENTION

This invention provides a tube coupling for receiving and holding an end of a tube comprising, a coupling body including a stem having an end to engage in a tube and an encircling head spaced from said end, a metal cap mounted on the head having an open end encircling the stem to receive a tube inserted into the cap over the stem, the cap including an annular wall having an internal tapered cam surface reducing towards said open end of the cap and a collet comprising an annular member located in the open end of the cap having a plurality of resilient fingers extending into the cap which engage the tapered surface to be pressed inwardly thereby with an outward movement of the collet from the cap to engage and grip the outer surface of the tube inserted into the cap over the stem to lock the tube in the cap; wherein the wall of the cap encircling the head has a plurality of inwardly angled teeth formed on the wall and extending towards the open end of the cap, and the head has an annular abutment facing away from the stem which the tabs snap over as the cap is pressed onto the head to engage behind the abutment to retain the cap on the head.

In one embodiment of the invention the internal tapered cam surface of the cap may terminate in a short cylindrical bore in which said annular member of the collet engages.

More specifically the short cylindrical bore of the cap may have an encircling flared entry portion to the end of the cap to assist insertion of the collet into the end of the cap.

Preferably the cap comprises a metal or plastics sleeve of uniform wall thickness.

It is also preferred that the cap has one or more windows spaced around the cap where it encircles the stem adjacent the head of the coupling body to enable an operator to check that a tube is fully engaged onto the stem of the coupling body up to the head.

In the latter arrangement the cap may have one or more rectangular windows spaced around the cap.

More specifically the window or windows extend into the part of the cap encircling the head of the coupling body.

In a specific arrangement the locking elements may comprise one or more inwardly directed teeth on the cap and the head of the coupling body has an annular encircling recess to receive said element or elements.

In the case where the cap has one or more windows, the cap may have an inwardly angled tooth formed in the or each window of the cap, the tooth or teeth snapping into the recess in the head when the cap is inserted over the head to prevent withdrawal of the cap.

In the case where the or each window is rectangular, the or each inwardly angled tooth may be formed at an end of a window.

For example the or each window may have a tooth extending inwardly towards the tapered cam surface of the cap.

In the latter arrangement the periphery of the side of the recess in the head of the coupling body nearest the stem may have an encircling rebate in which the inwardly angled tooth or teeth are engageable to retain the cap on the head.

In a further arrangement the or each window may have an inwardly angled tooth extending from the end of the window adjacent the stem to engage in the recess in the head to retain the cap in the head.

In a further embodiment of the invention the wall of the cap between the or each window and the adjacent end of the cap provides a web which is deformed into the recess in the head to retain the cap on the head.

In a still further arrangement the detent means may comprise an inturned lip on the open end of the cap encircling the head which engages in the recess to retain the cap on the head.

In any of the above arrangements the stem may have means to seal in a tube located on the stem.

More particularly the sealing means may comprise an 'O' ring or rings located in a groove or grooves in the stem or an encircling barb or other raised projection on the stem.

In any of the above arrangements the coupling body/cap assembly may have a cover comprising a sleeve having an open end which encircles and has a gripping engagement with the head of the coupling body and has an end wall at the other end which overlies the end of the coupling body and has an aperture through which a tube can extend to engage the coupling body.

Also in any of the above arrangements the stem may have a throughway for fluid flow through the coupling body.

Applications of the invention may include a coupling body having a head which is elongated and has stems projecting on either side of the head with caps extending from the head over the respective stems to form an in line coupling for tubes to be connected together.

For example the coupling body may include an elbow with heads at either end of the elbow and stems projecting from the respective heads, and caps on the respective heads encircling the stems to receive tubes to be coupled together.

The invention also provides a tube coupling cartridge for receiving and holding an end of a tube comprising, a cap for mounting on a coupling body which includes a stem having an end to engage in a tube and an encircling head spaced from said end, a cap having an open end for encircling the stem to receive a tube inserted into the cap over the stem and having an internal tapered cam surface reducing towards the open end of the cap and a collet comprising an annular member located in the open end of the cap having a plurality of resilient fingers extending into the cap which engage the tapered surface to be pressed inwardly thereby with an outward movement of the collet from the cap to engage and grip the outer surface of the tube inserted into the cap over the stem to lock the tube in the cap.

BRIEF DESCRIPTION OF THE DRAWINGS

The following is a description of some specific embodiments of the invention, reference being made to the accompanying drawings in which.

DETAILED DESCRIPTION OF THE PREFERRED EMBODIMENTS

Figure 1:
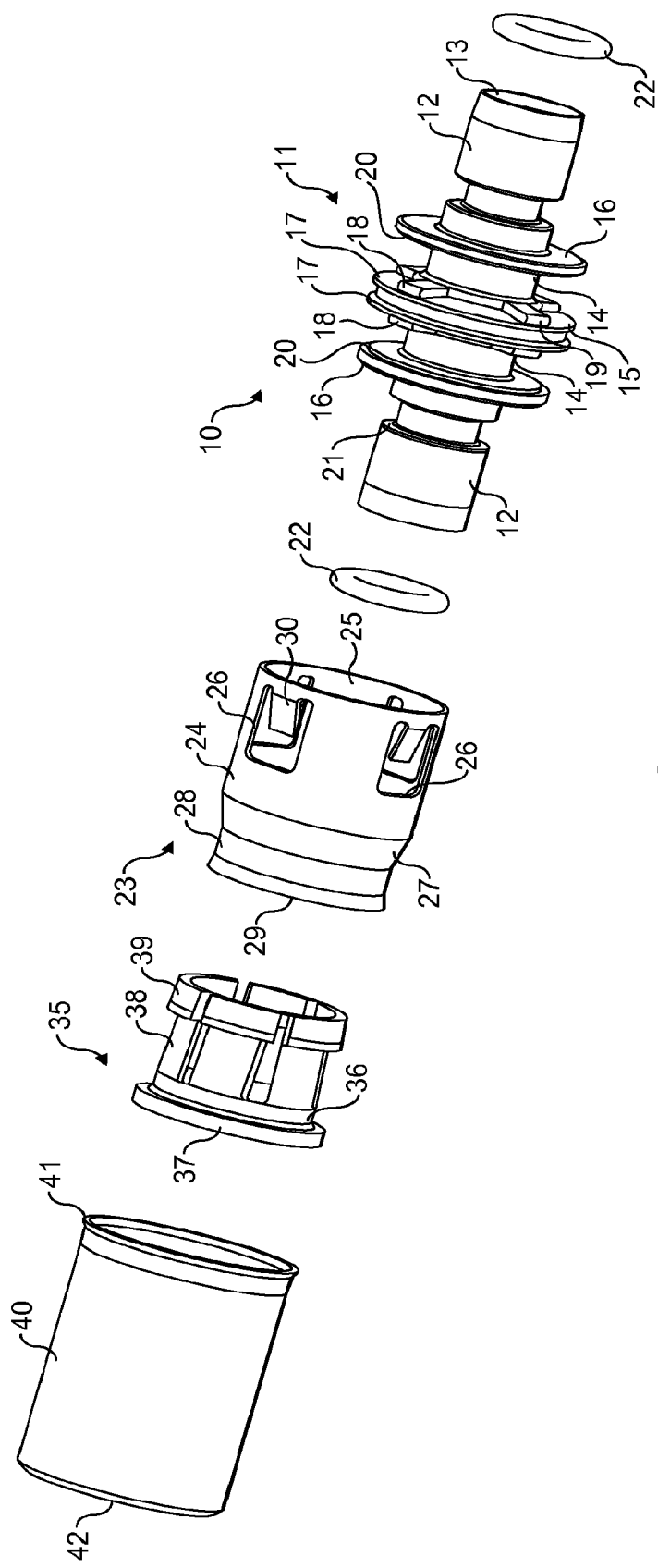
FIG. 1 is an exploded perspective view of a double ended in-line tube coupling.

Referring firstly to FIGS. 1 to 4 of the drawings, there is shown a double ended in-line tube coupling for connecting a pair of tubes together to provide fluid flow between the tubes. The coupling comprises a plastics molded coupling body indicated generally at 10 comprising a central head indicated at 11 and in-line stems 12 projecting on either side of the head 11 to receive a pair of tubes to be coupled together. A throughway 13 extends through the coupling body 10 for flow of fluid between the tubes.

The head 11 of the coupling body 10 is of cylindrical form and has a pair of spaced deep annular grooves 14 which divide the head 11 into a central member 15 and end walls 16.

Figure 2:
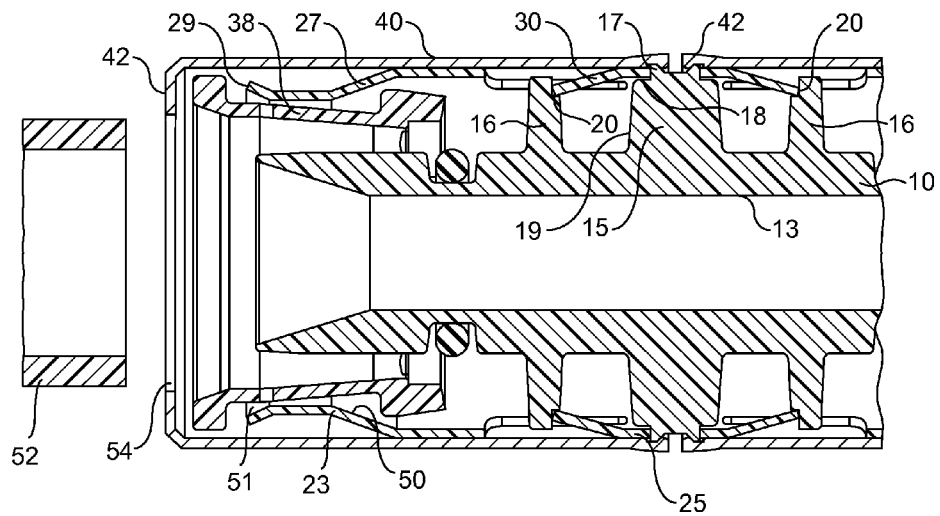
FIG. 2 is a cross-sectional view through one end of the tube coupling of FIG. 1 showing a tube in position to be inserted into the coupling.

The central member 15 of the head 11 has annular ridges 17 around its outer periphery as best seen in FIG. 2 for engaging in the open ends of caps as described later. Below the ridges 17 the central member 15 has peripheral rebates 18 again as best seen in FIG. 2 to receive the ends of caps as described later. The sides of the central member 15 of the head 11 have raised cruciform shaped elements 19 formed integrally with either side of the central member 15 to stiffen the central member 15. The end walls 16 also have encircling annular rebates 20 around the outer peripheries also for a purpose to be described later.

Figure 3:
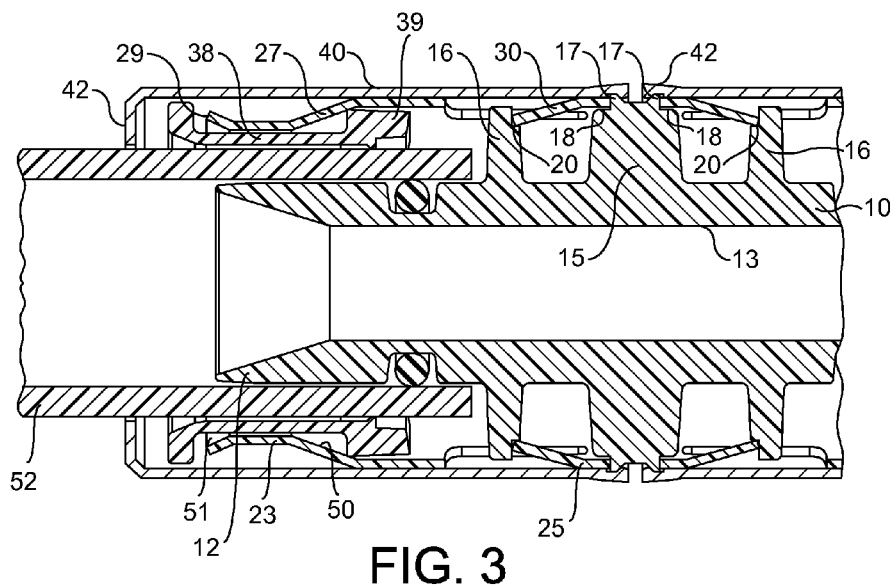
FIG. 3 is a similar view of FIG. 2 with the tube inserted into the coupling.

The stems 12 of the coupling body 10 projecting beyond the end walls 16 have annular grooves 21 to receive "O" rings 22 to seal with the inner surfaces of tubes 52 engaged over the stems 12 as best seen in FIG. 3 of the drawings. To hold the tubes 52 on the stems 12, the coupling body 10 is provided with metal (or plastic) caps 23 which fit onto the head 11 at the centre of the coupling body 10 and extend over the stems 12 to either side of the head 11. The caps 23 are of uniform wall thickness and in the case of metal caps may be formed from brass or stainless steel.

Each cap 23 comprises a cylindrical part 24 having an open end 25 which, when the cap 23 is fitted to the coupling body 10, engages in the rebate 18 in the central member 15 of the head 11 as best seen in FIGS. 2 and 3. Each cap 23 has four generally rectangular windows 26 formed in the cylindrical part 24 of the cap 23 at equi-spaced locations around the cap 23 by cropping out teeth 30 which are angled inwardly with respect to the cylindrical part 24 and extend away from the open end 25. When the cap 23 is inserted on the head 11 of the coupling body 10 with the open end 25 of the cap 23 engaged in the rebate 18 in the central member 15 of the coupling body 10, the angled teeth 30 snap over the end wall 16 and lodge in the annular rebate 20 formed in the end wall 16 to resist withdrawal of the cap 23 from the coupling body 10. The rectangular windows 26 formed by cropping out the angled teeth 30 from the coupling body 10 provide the ability to make a visual inspection of the engagement of the tube 52 on the stem 12 within the cap up to the head 11.

The cylindrical part 24 of the metal cap 23 is deep drawn at the end of the cap 23 away from open end 25 to form a tapering section 27 which provides an internal cam surface 50 within the cap 23 as best seen in FIG. 2. The tapered section 27 gives way to a short cylindrical section 28 which terminates in an outwardly flared end portion 29. Tube 52 is inserted into the cap 23 and onto the stem 12 within the cap 23.

A collet 35 is located in the reduced diameter end of the cap 23, the collet 35 comprising an annular part 36 having a plurality of axially projecting resilient teeth 38 which terminate in heads 39 for engaging the tapered cam surface 50 formed by the reducing diameter section 27 of the cap 23.

The heads 39 of the collet 35 bear against the outside surface of the tube 52 inserted onto the coupling body 10 as shown in FIG. 3 which forces the outer sides of the heads 39 into engagement with the tapered internal cam surface 50 formed by the cap 23.

The tube 52 can be withdrawn from the coupling body 10 by pressing an outer end 37 of the annular part 36 collet 35 inwardly to release engagement of the heads 39 of the collet 35 with the tapered internal cam surface 50 of the cap 23, thereby releasing the inward force on the heads 39 allowing the tube 52 to slide between the collet 35 and the stem 12 and to be withdrawn from the coupling body 10.

The cap and collet assembly can be covered in use to prevent accidental release of a tube from the collet 35 and to prevent ingress of dirt by a cylindrical cover 40 which fits over the cap 23. The cover 40 has a open end 41 that is arranged to be a snap fit onto the head 11 or the cap 23. The other end of the cover 40 has an end wall 42 formed with a central aperture 54 through which the tube 52 is inserted onto the coupling body 10. A similar arrangement is provided on the other side of the coupling body 10 so that tubes can be secured to the stems 12 on either side of the coupling body 10 to provide a fluid connection between the tubes.

Essentially the connector is made up of four components, a body, an O ring, a metal cap and a collet. The connector can also be assembled with the collet cover to make the connection either more attractive or robust.

In addition to its low component count, the connector is also very easy to manufacture. The coupling body can be produced from simple, robust and relatively cheap mould tools. The cap is a deep-drawn metal component with a number of side windows creating the same number of angled teeth. Assembly of the cap onto the body is very simple; the cap is simply pushed onto the body and the teeth flex out and engage behind the raised end wall on the body. A tensile load to disengage the cap from the body will cause the angled teeth to flex inwardly thereby increasing the level of engagement.

The simplicity of the cap design and its assembly onto a raised flange or wall also lends itself to potential sales as a cartridge or collet/cap assembly kit for utilization by OEMs (Original Equipment Manufacturers) on their own products or coupling body/cap assembly.

The angled teeth can also be designed to grip the plane outside diameter of the fitting body or OEM port. Viewing windows help the user to see the end of the tube when it has been fully inserted into the connector. Thereafter the user can engage the collet cover in position to improve the connection's appearance and robustness by ensuring that debris does not enter the connector and to eliminate accidental release of the collet.

Figure 4:
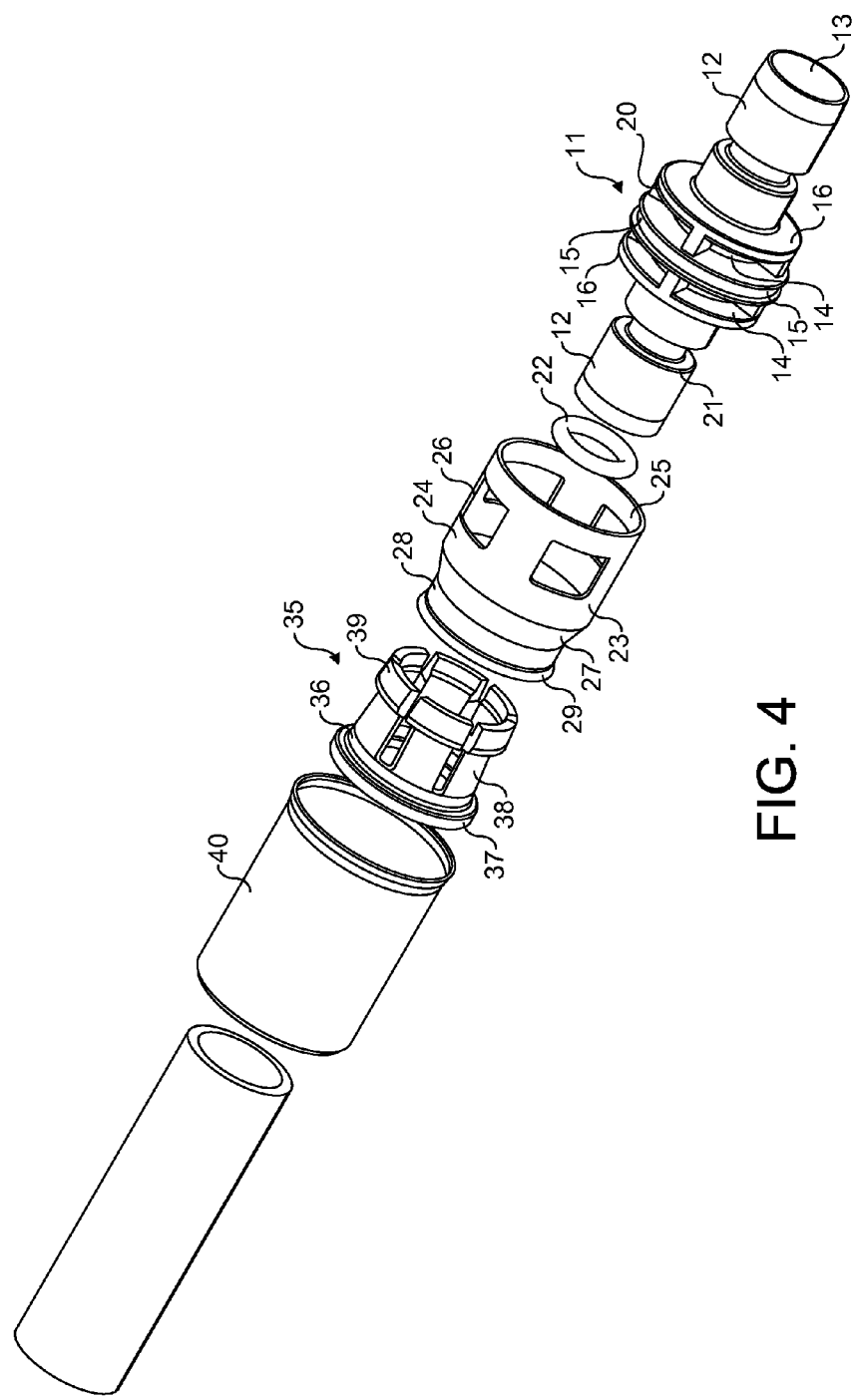
FIG. 4 is an exploded perspective view of a first modified double ended in-line tube coupling.
Figure 5:
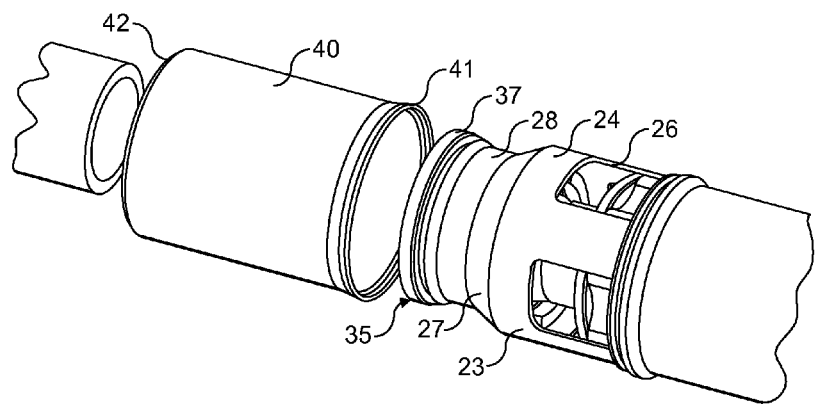
FIG. 5 is a perspective view of the coupling of FIG. 4 with the components partially assembled.

A first alternative design of the cap is shown in FIGS. 4 and 5 to which reference will now be made. Like parts to those described earlier with reference to FIGS. 1 to 3 have been given the same reference numerals.

The central head 11 of the coupling body differs in that there are integral radial webs between the central member 15 of the head 11 and the end walls 16 creating sector shaped recesses between the central member 15 and the end walls 16. The cap 23 has rectangular windows 26 as before but the angled teeth 30 (FIG. 1) formed by pressing out the windows 26 are dispensed with and are completely removed. The resulting bands or straps between the ends of the windows 26 and the open end 25 of the cap 23 are bent or deformed into the respective recesses between the central member 15 of the head 11 and the end walls 16 to hold the cap 23 in situ on the head 11 as best seen in FIG. 5. The arrangement is otherwise similar to that of FIGS. 1 to 3.

Figure 6:
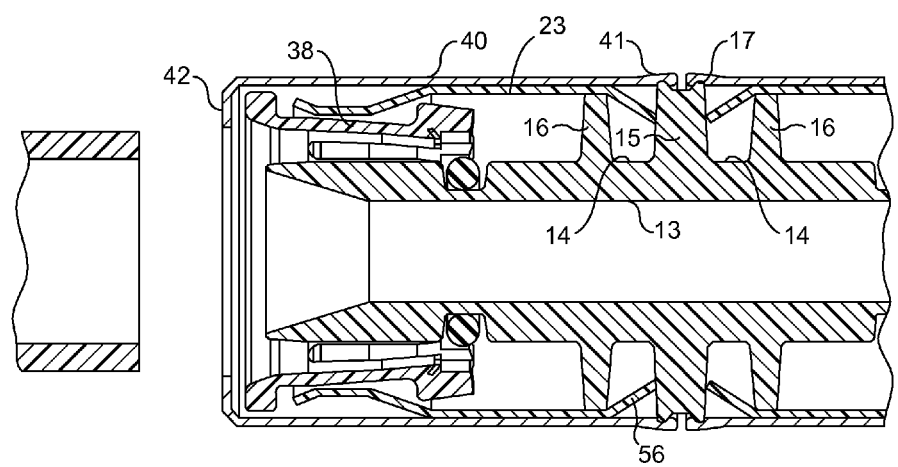
FIG. 6 is a cross-sectional view through a second modified form of the tube coupling.

A further modification is shown in FIG. 6 in which a coupling body is as shown in FIGS. 1 to 3 providing annual grooves 14 between the central portion 15 of the head and the end walls 16. An edge portion 56 of the cap 23 is crimped or otherwise deformed into the groove 14 to retain the cap 23 on the coupling body.

The various versions of the coupling shown in FIGS. 1 to 6 are specifically for a connector that seals on the inside diameter of a pipe. However the designs can be adapted to produce a connector that seals on the outside diameter of a pipe. In this case, sealing by means of O rings for example would need to be effected between the connector cap and tube and between the cap and connector body.

It will be understood that the invention is applicable to a wide variety of couplings in addition to the in line tube couplings described above. For example it is applicable to elbow and other multiple couplings, to in line reducers to fittings combining other forms of tube couplings, to manifold connections and other similar arrangements.

What is claimed is:

1. A tube coupling for receiving and holding an end of a tube comprising:
    a coupling body including a stem having an end to engage in the tube and an encircling head spaced from said end;
    a cap mounted on the head and encircling the stem, the cap having an end with an opening formed thereat that is configured to receive the tube inserted into the cap over the stem, the cap having an internal tapered cam surface reducing towards the opening of the cap; and
    a tube locking collet at least partially disposed within the cap comprising an annular member having a plurality of resilient fingers extending into the cap, the resilient fingers being arranged to be deflected radially outward by insertion of the tube and engaging the internal tapered cam surface of the cap so as to be pressed inwardly to engage and grip the outer surface of the tube when the tube is inserted into the cap over the stem to lock the tube in the cap;
    wherein the cap has locking elements which engage the head of the coupling body to hold the cap on the head, the locking elements comprising a plurality of inwardly angled resilient teeth at circumferentially spaced locations around the cap, the head of the coupling body having an encircling annular recess into which the teeth are received to secure the cap to the head;
    wherein the cap has a plurality of windows spaced around the cap where the cap encircles the stem adjacent the head of the coupling body to enable an operator to check that the tube is fully engaged onto the stem of the coupling body up to the head;
    wherein each of the plurality of resilient teeth is formed in a corresponding one of the plurality of windows and extends inwardly at an angle towards the tapered cam surface of the cap; and
    wherein the recess in the head of the coupling body is bounded by a side having a periphery, an encircling rebate being formed on the periphery in which the inwardly angled teeth are received to retain the cap on the head.

2. A tube coupling as claimed in claim 1, wherein the internal tapered cam surface of the cap terminates at a sleeve section in which at least a portion of the annular member of the collet is disposed.

3. A tube coupling as claimed in claim 2, wherein the sleeve section of the cap has an encircling outwardly flared entry portion at the end of the cap to assist insertion of the collet into the opening of the cap.

4. A tube coupling as claimed in claim 1, wherein the cap is comprised of metal or plastic and has a uniform wall thickness.

5. A tube coupling as claimed in claim 1, wherein the plurality of windows are rectangular.

6. A tube coupling as claimed in claim 1, wherein the plurality of windows extend into a part of the cap encircling the head of the coupling body.

7. A tube coupling as claimed in claim 1, wherein each window is rectangular and wherein each inwardly angled tooth is formed at an end of a corresponding window.

8. A tube coupling as claimed in claim 1, wherein each inwardly angled tooth extends from the end of the window adjacent the stem to engage in the recess in the head to retain the cap to the head.

* * * * *